(12) United States Patent
Gould et al.

(10) Patent No.: US 6,920,561 B1
(45) Date of Patent: Jul. 19, 2005

(54) METHOD AND SYSTEM FOR ENABLING FREE SEATING USING BIOMETRICS THROUGH A CENTRALIZED AUTHENTICATION

(75) Inventors: Christopher Britton Gould, Raleigh, NC (US); Howard Jeffery Locker, Cary, NC (US); Andy Lloyd Trotter, Raleigh, NC (US); Michael T. Vanover, Raleigh, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,048

(22) Filed: Mar. 31, 2000

(51) Int. Cl.[7] .............................. G06F 11/30; H04L 9/32
(52) U.S. Cl. ....................... 713/186; 713/185; 713/182; 713/156
(58) Field of Search .................................. 713/156, 186

(56) References Cited

U.S. PATENT DOCUMENTS

| | | | |
|---|---|---|---|
| 5,208,858 A | | 5/1993 | Vollert et al. |
| 5,337,043 A | | 8/1994 | Gokcebay |
| 5,682,142 A | | 10/1997 | Loosmore et al. |
| 5,787,186 A | | 7/1998 | Schroeder |
| 5,862,223 A | | 1/1999 | Walker et al. |
| 6,076,167 A | * | 6/2000 | Borza .......................... 713/201 |
| 6,167,517 A | * | 12/2000 | Gilchrist et al. ............ 713/186 |
| 6,193,153 B1 | * | 2/2001 | Lambert ....................... 235/380 |
| 6,202,151 B1 | * | 3/2001 | Musgrave et al. ........... 713/186 |

FOREIGN PATENT DOCUMENTS

| | | |
|---|---|---|
| WO | WO9850875 | 11/1998 |
| WO | WO9908238 | 2/1999 |

OTHER PUBLICATIONS

IBM Technical Disclosure Bulletin, vol. 41, No. 01, Jan. 1998.

* cited by examiner

Primary Examiner—Gilberto Barrón, Jr.
Assistant Examiner—Cas Stulberger
(74) Attorney, Agent, or Firm—Sawyer Law Group LLP

(57) ABSTRACT

A method for providing an authentication of a user of a computer system in a network is disclosed. The method comprises capturing biometric data of a user; encrypting and signing the biometric data with a private key and sending the encrypted and signed data to a central server in the network. The method further comprises accepting and verifying credentials associated with the signed and encrypted data from the server utilizing the public key from the server. The method further comprises installing the credentials into the computer if the credentials are verified. In a method and system in accordance with the present invention, a user can walk up to any client within an enterprise and have their locally captured biometric input authenticated at a central server. The user can then have their individual credentials securely imported to the local client for subsequent use during that time period, without needing any additional identification or memory token such as a smartcard.

13 Claims, 5 Drawing Sheets

System Setup

METHOD AND SYSTEM FOR ENABLING FREE SEATING USING BIOMETRICS THROUGH A CENTRALIZED AUTHENTICATION

FIELD OF THE INVENTION

The present invention relates in general to data processing systems and, in particular, to a data processing system and method for authenticating a user of a data processing system.

BACKGROUND OF THE INVENTION

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed storage drive (also known as a "hard drive"), a pointing device such as a mouse, and an optional network interface adapter. One of the distinguishing characteristics of these systems is the use of a motherboard or system planar to electrically connect these components together.

In an environment where there are multiple computers it is desirable that a user be authorized to use any of the computers thus allowing open seating. Biometric indices reliably identify but provide no authentication credentials. Public Key Infrastructure (PKI) certificates and keys reliably bind information to an entity but do not verify that the authorized person is using the credentials.

Existing solutions address this problem by requiring the user to carry either a secure memory token such as a smartcard or to have previously installed their credentials on the machine. Smartcards are relatively expensive to deploy and manage and result in access denial when lost or forgotten. Local storage of credentials require that the user had previously enrolled his information on that client and is inconsistent with the notion of true open seating.

Therefore a need exists for a data processing system and method for permitting only preregistered client hardware to access a service executing on a remote server computer system. The present invention addresses such a need.

SUMMARY OF THE INVENTION

A method for providing an authentication of a user of a computer system in a network is disclosed. The method comprises capturing biometric data of a user; encrypting and signing the biometric data with a private key and sending the encrypted and signed data to a central server in the network. The server encrypts the bio, pulls associate credentials from a secure database, encrypts the credentials and sends to the client. The method further comprises the client accepting and verifying credentials associated with the signed and encrypted data from the server utilizing the public key from the server. The method further comprises installing the credentials into the computer if the credentials are verified.

In a method and system in accordance with the present invention, a user can walk up to any client within an enterprise and have their locally captured biometric input authenticated at a central server. The user can then have their individual credentials securely imported to the local client for subsequent use during that time period, without needing any additional identification or memory token such as a smartcard.

DETAILED DESCRIPTION

The present invention relates in general to data processing systems and, in particular, to a data processing system and method for authenticating a user of a data processing system. The following description is presented to enable one of ordinary, skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
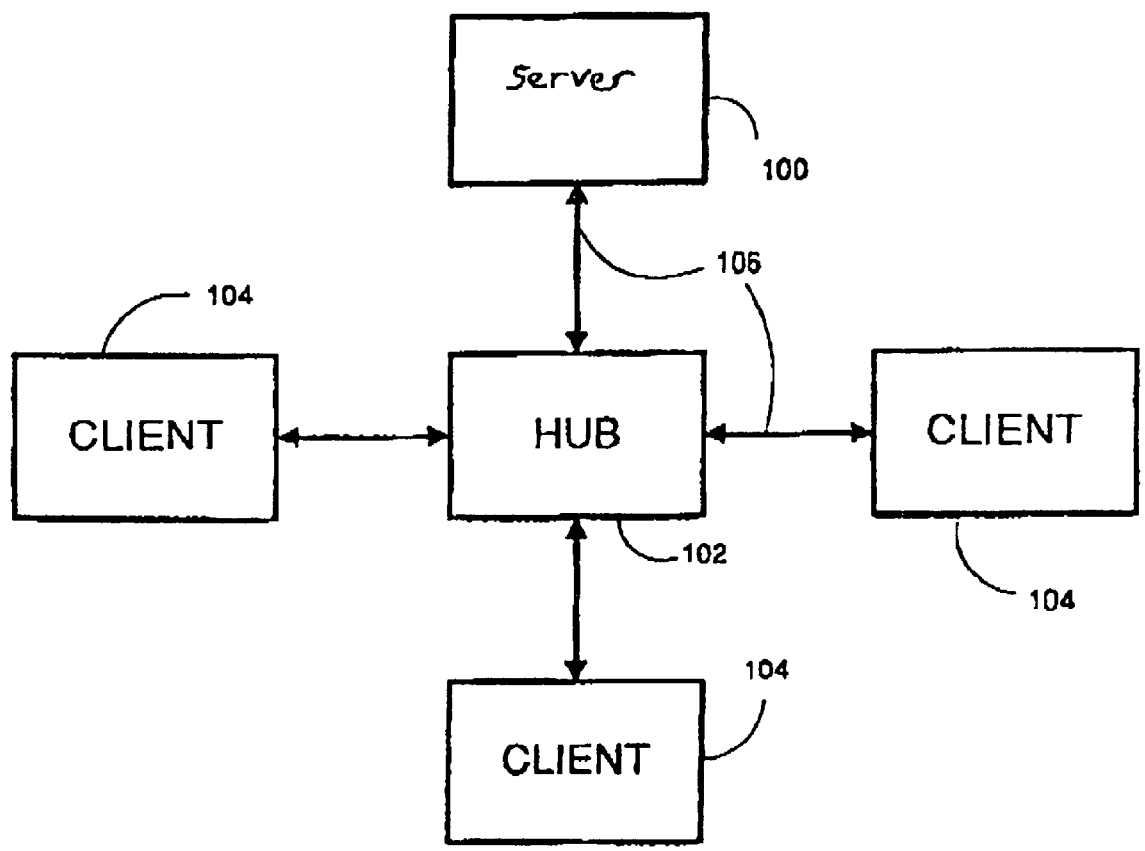
FIG. 1 illustrates a pictorial representation of a data processing system in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 and client computer systems 104 are connected to hub 102 utilizing a communication link 106. Communications link 106 may conform to a local area network standard such as the Ethernet specification, or may be a wide area network (WAN) utilizing a telephone network. Those skilled in the art will recognize that the invention described herein may be implemented utilizing any suitable type of data communications channel or link. In addition, communications link 106 may simultaneously include multiple different types of data communications channels.

Figure 2:
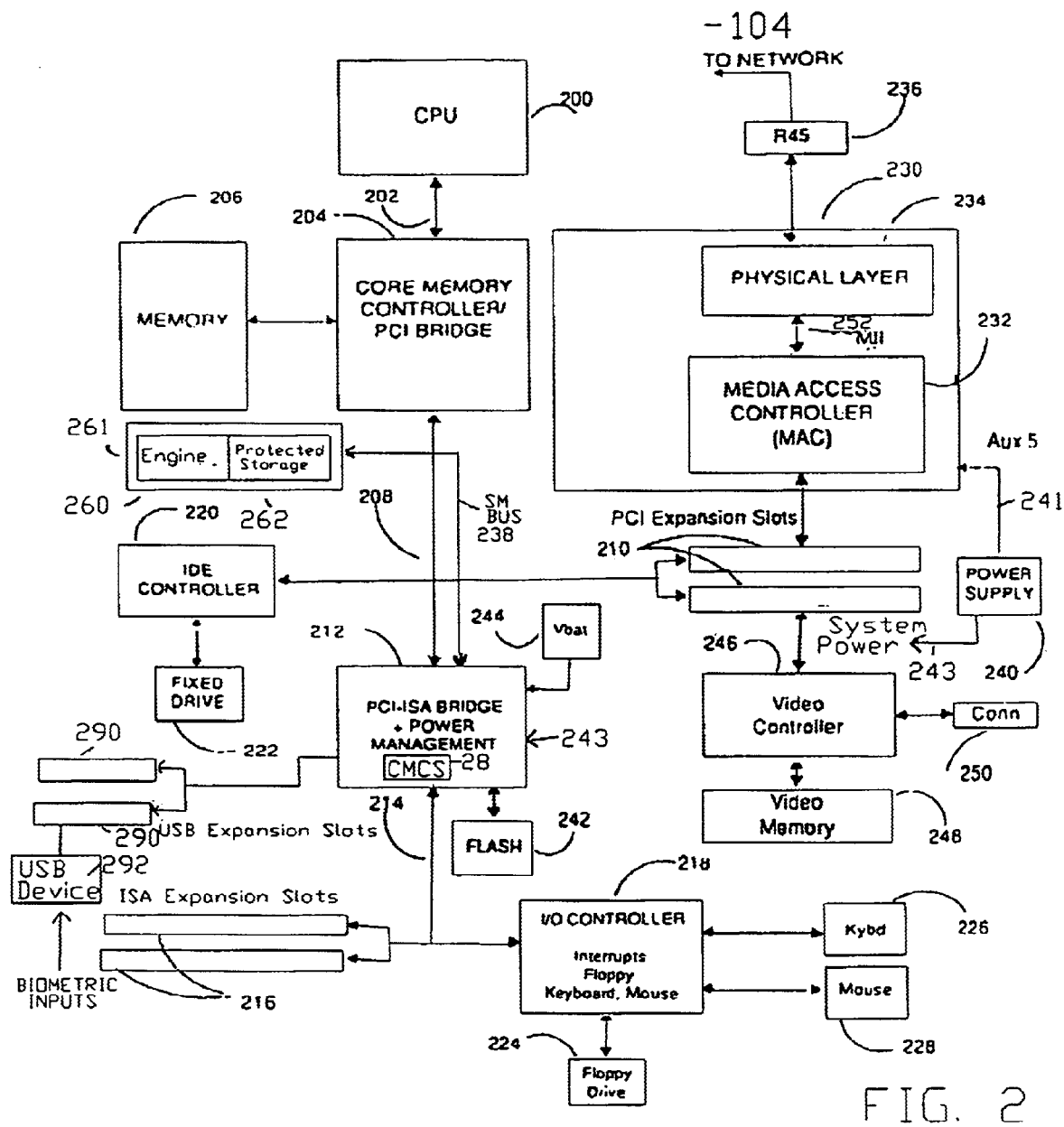
FIG. 2 depicts a more detailed pictorial representation of a client computer system in accordance with the method and system of the present invention.

FIG. 2 depicts a more detailed pictorial representation of a computer system 104 which may be utilized to implement a client computer system of FIG. 1 in accordance with the method and system of the present invention. Computer 104 includes a planar (also commonly called a motherboard or system board) which is mounted within computer 104 and provides a means for mounting and electrically interconnecting various components of computer 104 including a central processing unit (CPU) 200, system memory 206, and accessory cards or boards as is well known in the art.

CPU 200 is connected by address, control and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such as a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 104 includes a video controller 246 which may, for example, be plugged into one of PCI expansion slots 210. Video controller 246 is connected to video memory 248. The image in video memory 248 is read by controller 246 and displayed on a monitor (not shown) which is connected to computer 104 through connector 250.

Computer system 104 includes a power supply 240 which supplies full normal system power 243, and has an auxiliary power main AUX 5 241 which supplies full time power to the power management logic 212, and to a network adapter 230.

Network adapter 230 includes a physical layer 234 and a media access controller (MAC) 232 coupled together utilizing a Media Independent Interface (MII) bus 252. The MII 252 is a specification of signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit computer system 108 to communicate with server 100 utilizing communications link 106.

MAC 232 processes digital network signals, and serves as an interface between a shared data path, i.e., the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/ reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of computer system 104. Second, it advertises its own capabilities to server computer 100. Third, it establishes a connection with server computer 100 using the highest performance connection technology.

In accordance with the present invention, the planar includes an encryption device 261 which includes an encryption/decryption engine 260 which includes an encryption/decryption algorithm which is utilized to encode and decode messages transmitted and received by the planar, and protected storage 262. Engine 260 can preferably perform public/private key encryption. Engine 260 may access a protected storage device 262. Protected storage device 262 is accessible only through engine 260. Priority information stored within storage 262 is protected by engine 260 and is not accessible to the planar or its components except through engine 260. Device 262 may be implemented utilizing an electronically erasable storage device, such as an EEPROM.

Encryption device 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that encryption device 261 may be coupled to another bus within the planar.

In a preferred embodiment, biometric inputs can be provided via USB device 292. Such biometrics include but are not limited to fingerprint, retina scans, voice and handwriting. The USB device 292 in turn is coupled to a USB expansion slot 290. The USB slot 290 in turn is coupled to the PCI-ISA bridge controller 212.

In a method and system in accordance with the present invention, a user can walk up to any client within an enterprise and have their locally captured biometric input authenticated at a central server. The user can then have their individual credentials securely imported to the local client for subsequent use during that time period, without needing any additional identification or memory token such as a smartcard.

To describe the various features of the present invention, refer now to the following description in conjunction with the accompanying figures. In a system in accordance with the present invention, the authentication system is set up. The authenticated biometric information is installed in a computer and the client information is installed. The following described these features in more detail.

Figure 3:
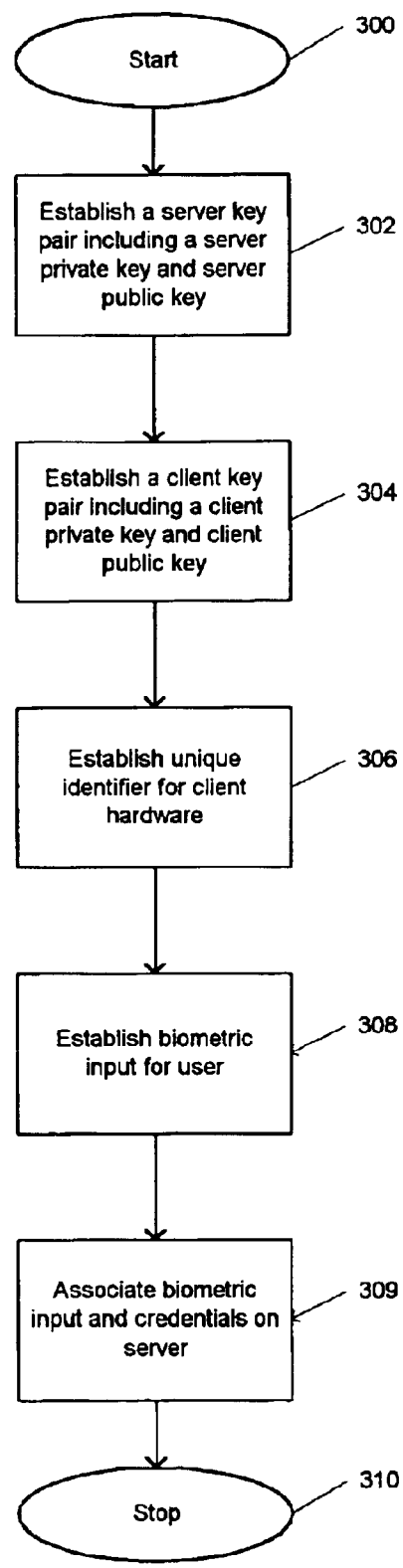
FIG. 3 illustrates setting up a system in accordance with the present invention.

FIG. 3 illustrates setting up a system in accordance with the present invention starting at 300. First, a server key pair is established including a server private key and server public key, via step 302. Then a client key pair including a client private key and client public key is established, via step 304. A unique identifier for client hardware is established, via step 306. Biometric input is established for the user, via step 308. Biometric input and user credentials are associated together to provide a template which is stored in a database on the server, via step 309. The process is completed, via step 310. System setup occurs once; however, users and computers may be added or deleted using this process.

Figure 4:
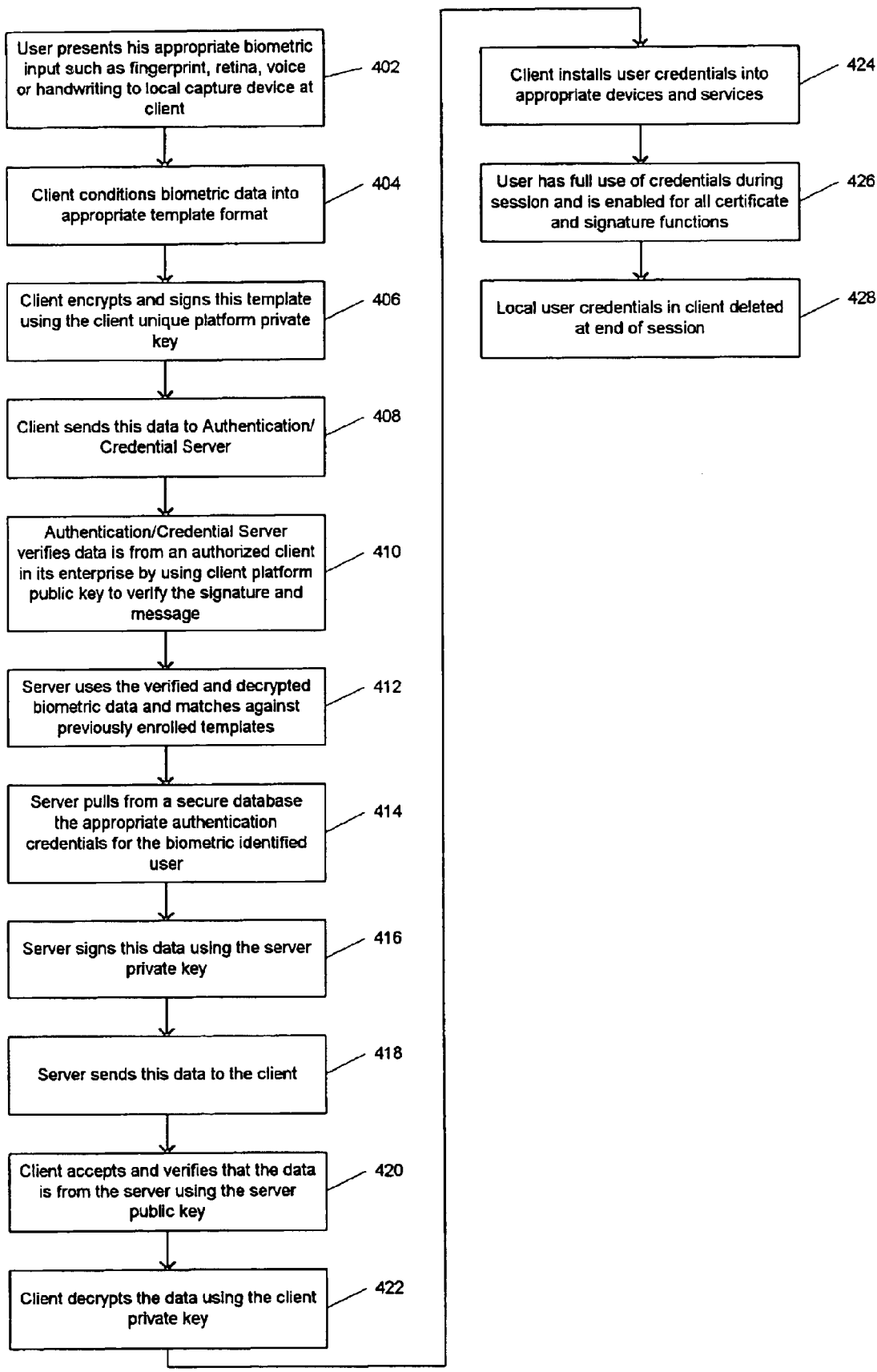
FIG. 4 is a flow chart which illustrates the connectivity of the above-identified functions in accordance with the present invention.
Figure 5:
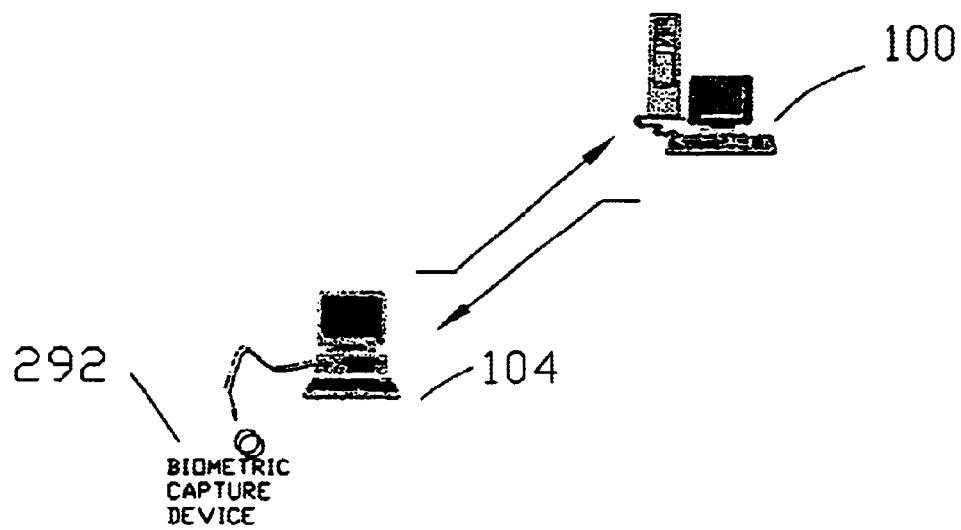
FIG. 5 is a diagram which illustrates the method of operation of biometric capture device and alert operations in accordance with the present invention.

FIG. 4 is a flow chart which illustrates the connectivity of the above-identified functions in accordance with the present invention. FIG. 5 is a diagram which illustrates the method of operation of biometric capture device 292 within a client 104 and alert operations within server 100 in accordance with the present invention.

Referring to FIGS. 4 and 5 together, first, a user presents the appropriate biometric input such as fingerprint, retina, voice, or handwriting to the biometric device (i.e., USB device 292) at the client 104, via step 402. Next, the client 104 conditions the biometric data into an appropriate template format, via step 404. The client 104 then signs and encrypts this template using the client unique platform private key and server public key, via step 406. Then the client 104 sends this data to a server 100, via step 408. The server 100 verifies that the data is from an authorized client in its enterprise by using a client platform public key and server private key to decrypt and verify the signature and message, via step 410. Then the server 100 uses the verified and decrypted biometric data and matches it against previously enrolled templates, via step 412. These templates would typically have been captured during initial employee enrollment into the enterprise (i.e., when initially badged or granted access privileges).

Next, the server 100 pulls from a secure database the appropriate authentication credentials for the biometric identified user and encrypts them using the client platform public key and server private key, via step 414. The server 100 then signs this data using the server private key, via step 416. At this point the server 100 sends this data to the client 104, via step 418. The client 104 accepts and verifies that the data is from the server 100 using the server public key, via step 420. The client 100 then decrypts the data using the client private key, via step 422. The client 104 installs user credentials into appropriate devices and services, via step 424. A user of the computer has full use of credentials during session and is enabled for all certificate and signature related functions, via step 426. Local user credentials in client 104 are then deleted at end of session, via step 428.

Accordingly, a method and system in accordance with the present invention provides the following benefits and advantages over existing solutions. Management and control of all identification and credential services are taken care of through a centralized entity. This allows for centralized policy management, centralized and consistent biometric matching algorithms, and centralized and controlled privilege management (enrollment and revocation of rights). Strong identification of user is provided through biometrics without requiring previous enrollment at that client. No additional element such as a smartcard is required for user credentials. No previous enrollment by user at the client is required for user credentials. Secure and authenticated transmission of biometric data and credentials using platform and server keys ensures that the request is sourced from an authorized client within the enterprise and that data is not modified in transit.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for providing an authentication of a user of a computer in a network, the method comprising the steps of:

(a) capturing biometric information of the user by the computer;

(b) encrypting the biometric information using a secure server's public key and signing the biometric information with a private key of the computer system;

(c) sending the encrypted and signed information from the computer to the secure server in the network;

(d) accepting and verifying credentials associated with the signed and encrypted information from the secure server utilizing the public key from the secure server; and (e) installing the credentials into the computer if the credentials are verified.

2. The method of claim 1 wherein the biometric information comprises fingerprint information.

3. The method of claim 1 wherein the biometric information comprises retinal information.

4. The method of claim 1 wherein the biometric information comprises voice information.

5. The method of claim 1 wherein the biometric information comprises handwriting information.

6. The method of claim 1 wherein the secure server comprises an authentication credential server.

7. A system for providing an authentication of a user of a computer system in a network; the system comprising:

a secure server coupled to the computer system for authenticating biometric information of the user, wherein the secure server includes a database that stores credential information associated with biometric information; and a biometric capture device within the computer system for receiving the biometric information of the user and sending the biometric information to the secure server, wherein if the secure server authenticates the user via the biometric information, the secure server sends the associated credential information to the computer system such that the user can securely operate the computer system.

8. The system of claim 7 wherein the biometric information is encrypted utilizing a public key/private key pair.

9. The system of claim 7 wherein the biometric information comprises fingerprint information.

10. The system of claim 7 wherein the biometric information comprises retinal information.

11. The system of claim 7 wherein the biometric information comprises voice information.

12. The system of claim 7 wherein the biometric information comprises handwriting information.

13. The system of claim 7 wherein the secure server comprises an authentication credential server.

* * * * *